United States Patent
Brown et al.

(10) Patent No.: US 8,429,210 B2
(45) Date of Patent: Apr. 23, 2013

(54) METHOD AND COMPUTER-READABLE MEDIUM FOR PROVIDING AN OFFICIAL FILE REPOSITORY

(75) Inventors: Kevin L. Brown, Woodinville, WA (US); Jason M. Cahill, Woodinville, WA (US); Adrian Fanaru, Sammamish, WA (US); Ethan D. Gur-esh, Seattle, WA (US); Moshe R. Lutz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 12/147,301

(22) Filed: Jun. 26, 2008

(65) Prior Publication Data

US 2008/0306957 A1 Dec. 11, 2008

Related U.S. Application Data

(63) Continuation of application No. 11/107,067, filed on Apr. 15, 2005, now Pat. No. 7,617,263.

(51) Int. Cl.
*G06F 12/00* (2006.01)
*G06F 17/30* (2006.01)
*G06F 13/14* (2006.01)

(52) U.S. Cl.
USPC .......................................... 707/825; 707/812

(58) Field of Classification Search .................. 707/999.101–999.107, 999.003, 707/999.006, 999.2, 999.205, 782, 783, 793, 707/709, 735, 625, 825, 608, 725, 812, 1/1; 713/176; 726/27, 4–5; 709/219
See application file for complete search history.

(56) References Cited

U.S. PATENT DOCUMENTS

| 5,159,180 A | 10/1992 | Feiler |
| 5,412,190 A | 5/1995 | Josephson et al. |

(Continued)

OTHER PUBLICATIONS

U.S. Office Action dated Feb. 11, 2009, cited in U.S. Appl. No. 11/123,434.

(Continued)

*Primary Examiner* — Usmaan Saeed
*Assistant Examiner* — Cecile Vo
(74) *Attorney, Agent, or Firm* — Merchant & Gould P.C.

(57) ABSTRACT

A method and computer-readable medium are provided for storing files in an official file repository. According to the method, a generic interface is exposed that includes a first method for requesting that a file be stored in a file vault. A record series is maintained that identifies one or more document types that may be stored in the file vault along with a location for each file type within the file vault where files of the type should be stored. A call may be made to the first method including the file to be stored in the file vault. In response to the call, a location for storing the file in the file vault may be identified based on the contents of the record series. Once the location has been identified, the file is stored in the identified location if the file type is in the record series. If the file type is not in the record series or the necessary property values are not received with the call, the file is placed in a holding zone portion of the file vault. The generic interface may further expose a second method for retrieving the file types identified in the record series and a third method for retrieving one or more properties associated with a file type identified in the record series.

16 Claims, 5 Drawing Sheets

U.S. PATENT DOCUMENTS

| | | | |
|---|---|---|---|
| 5,586,235 | A | 12/1996 | Kauffman |
| 5,813,009 | A | 9/1998 | Johnson et al. |
| 5,920,700 | A | 7/1999 | Gordon et al. |
| 6,189,008 | B1 | 2/2001 | Easty et al. |
| 6,222,530 | B1 | 4/2001 | Sequeira |
| 6,289,460 | B1 | 9/2001 | Hajmiragha |
| 6,321,231 | B1 | 11/2001 | Jebens et al. |
| 6,332,146 | B1 | 12/2001 | Jebens et al. |
| 6,374,266 | B1 * | 4/2002 | Shnelvar ............................. 1/1 |
| 6,378,130 | B1 | 4/2002 | Adams |
| 6,947,959 | B1 | 9/2005 | Gill |
| 7,051,157 | B2 | 5/2006 | James |
| 7,146,388 | B2 | 12/2006 | Stakutis et al. |
| 7,198,210 | B2 | 4/2007 | Kusters |
| 7,281,019 | B2 | 10/2007 | Taketa et al. |
| 7,529,773 | B2 * | 5/2009 | Rogers ................................. 1/1 |
| 2003/0101072 | A1 | 5/2003 | Dick et al. |
| 2003/0105738 | A1 | 6/2003 | Taketa et al. |
| 2003/0212862 | A1 | 11/2003 | James |
| 2004/0091114 | A1 | 5/2004 | Carter et al. |
| 2004/0236770 | A1 | 11/2004 | Lee et al. |
| 2005/0066190 | A1 | 3/2005 | Martin |
| 2005/0076042 | A1 | 4/2005 | Stakutis et al. |
| 2006/0004820 | A1 * | 1/2006 | Claudatos et al. ............ 707/101 |
| 2006/0097089 | A1 | 5/2006 | Kusters |
| 2006/0178902 | A1 | 8/2006 | Vicars et al. |
| 2006/0235891 | A1 | 10/2006 | Brown et al. |

OTHER PUBLICATIONS

U.S. Office Action dated Aug. 9, 2007 cited in U.S. Appl. No. 11/123,434.

U.S. Office Action dated Sep. 27, 2007 cited in U.S. Appl. No. 11/107,067.

U.S. Office Action dated Jan. 10, 2008 cited in U.S. Appl. No. 11/123,434.

U.S. Office Action dated Jul. 21, 2008 cited in U.S. Appl. No. 11/123,434.

U.S. Office Action dated Aug. 29, 2008 cited in U.S. Appl. No. 11/107,067.

Co-pending U.S. Appl. No. 11/123,434, filed May 6, 2005, entitled "Method and Computer-Readable Medium for Jointly Managing Digital Assets and Non-Digital Assets".

Co-pending U.S. Appl. No. 11/107,067, filed Apr. 15, 2005, entitled "Method and Computer-Readable Medium for Providing an Official File Repository".

U.S. Amendment After Notice of Allowance filed Sep. 28, 2009, in U.S. Appl. No. 11/107,067 (2 pages).

U.S. Notice of Allowance mailed Jun. 26, 2009, in U.S. Appl. No. 11/107,067 (4 pages).

U.S. Preliminary Amendment filed Jun. 5, 2009, in U.S. Appl. No. 11/107,067 (4 pages).

U.S. Notice of Allowance mailed Feb. 26, 2009, in U.S. Appl. No. 11/107,067 (10 pages).

U.S. Advisory Action mailed Jan. 13, 2009, in U.S. Appl. No. 11/107,067 (3 pages).

U.S. Amendment After Final Dec. 29, 2008, in U.S. Appl. No. 11/107,067 (9 pages).

U.S. Amendment filed Dec. 27, 2007, in U.S. Appl. No. 11/107,067 (16 pages).

U.S. Response to Amendment Under Rule 312 filed Nov. 17, 2009, in U.S. Appl. No. 11/123,434 (2 pages).

U.S. Amendment After Notice of Allowance filed Nov. 4, 2009, in U.S. Appl. No. 11/123,434 (4 pages).

U.S. Notice of Allowance mailed Aug. 4, 2009, in U.S. Appl. No. 11/123,434 (15 pages).

U.S. Amendment filed May 11, 2009, in U.S. Appl. No. 11/123,434 (17 pages).

U.S. Amendment filed Dec. 22, 2008, in U.S. Appl. No. 11/123,434 (17 pages).

U.S. Amendment filed Mar. 25, 2008, in U.S. Appl. No. 11/123,434 (16 pages).

U.S. Advisory Action mailed Mar. 25, 2008, in U.S. Appl. No. 11/123,434 (3 pages).

U.S. Amendment filed Mar. 10, 2008, in Appl. No. 11/123,434 (15 pages).

U.S. Amendment filed Nov. 9, 2007, in U.S. Appl. No. 11/123,434 (17 pages).

* cited by examiner

METHOD AND COMPUTER-READABLE MEDIUM FOR PROVIDING AN OFFICIAL FILE REPOSITORY

CROSS-REFERENCE TO RELATED APPLICATION

This application is a continuation of prior U.S. patent application Ser. No. 11/107,067, entitled "Method and Computer-Readable Medium for Providing an Official File Repository," filed Apr. 15, 2005, and issued as U.S. Pat. No. 7,617,263 on Nov. 10, 2009, which is hereby incorporated herein by reference in its entirety.

BACKGROUND OF THE INVENTION

Modern business organizations are subject to a greater degree of regulatory scrutiny than ever before. Regulatory agencies such as the Securities and Exchange Commission ("SEC") impose specific reporting and record keeping requirements on certain classes of businesses. For instance, the record keeping requirements may specify the length of time certain categories of documents must be maintained. Records may be kept longer than the specified time, but cannot be destroyed earlier than the specified time period. As an example, certain types of documents must be retained for a minimum of seven years.

In order to assist with the proper retention of electronic documents, companies may utilize an official file repository. An official file repository is a storage location, typically on a server computer, into which electronic files may be placed for archival. Once placed into the proper location within the official file repository, documents are automatically retained for the appropriate period of time. An official file repository is typically administered by the records manager or compliance department within an organization. By utilizing an official file repository for important documents, users can be assured that their electronic files are properly archived and retained for an appropriate period of time.

Although official file repositories provide a convenient way to ensure that a file is retained in a proper manner, the available software products for implementing an official file repository suffer from a number of drawbacks. First, users frequently work within a collaborative environment or within an application program executing on their desktop computer. Users do not work directly within the official file repository. As a result, users often fail to place important files in the repository. Additionally, even when a user remembers to place a file in the repository, it is often difficult or inconvenient for a user to specify the appropriate meta-data, or property values, when storing files in the official file repository. As a result, users are unlikely to provide the data when submitting files to the official file repository. Consequently, the records manager or another employee in the compliance department must manually assign meta-data to files received at the official file repository. This can be a time consuming process.

Another drawback with the available software products for implementing an official file repository is that these products utilize proprietary interfaces. As a result, it is often difficult to use these products from within a large number of application programs. Moreover, because the interfaces are proprietary, it is often difficult for an application program to learn about the file types that may be stored within the official file repository and the property values that should be provided with a file of a particular type. These limitations can be especially frustrating for organizations attempting to utilize an official file repository software package with their preferred desktop or collaboration software packages.

It is with respect to these considerations and others that the various embodiments of the present invention have been made.

BRIEF SUMMARY OF THE INVENTION

In accordance with the present invention, the above and other problems are solved by a method and computer-readable medium for providing an official file repository. Through the use of the various embodiments of the invention, an official file repository is provided that exposes a generic interface that includes methods for saving a file into the repository, for retrieving information about the file types that may be saved to the repository, and for retrieving information about property values for each file type. By utilizing the interface, a software solution may be provided wherein documents may be manually or automatically stored in the official file repository at any time during the document lifecycle, and wherein the types of documents and their associated properties that may be stored in the official file repository may be easily identified. Because the interface is generic, many application programs and collaboration packages can directly utilize the services of the official file repository.

According to one aspect of the invention, a computer-readable medium is provided having computer-executable instructions stored thereon which, when executed by a computer, will cause the computer to expose a generic interface for interacting with an official file repository (the official file repository may also be referred to herein as a "file vault"). In particular, the interface includes a first method for requesting that a file be stored in the file vault, a second method for retrieving a record series identifying the file types that may be stored in the file vault, and a third method for retrieving data identifying one or more properties associated with a one of the file types. The methods may be exposed via a standard web services protocol or via a simple mail transfer protocol ("SMTP").

According to other aspects of the invention, the record series may also be utilized to store data identifying a location in the file vault for each file type. The computer-readable medium may also include further computer-readable instructions which, when executed by the computer, will cause the computer to receive a call to the first method including a file to be stored in the file vault, a type associated with the file, and one or more property values for the file. In response to the call to the first method, the computer will determine if the type associated with the file is in the record series, and whether one or more necessary property values associated with the type were received with the call. If the file is in the record series and the necessary property values were received with the call, the file will be stored in the file vault in the location specified by the record series for the file type.

If the file type is not identified in the record series, or the necessary property values are not received with the call, the file is placed in a holding zone within the file repository. A response may also be transmitted to the call to the first method with a request for the type or the needed properties. When the needed file type or properties are received, the file is moved from the holding zone to the location within the repository specified by the record series for the file type. Details regarding the internal directory structures and other information regarding the operation of the official file repository are not available through the interface.

According to other embodiments of the invention, the computer-readable medium includes further computer-readable instructions which, when executed by the computer, will cause the computer to receive a call to the second method. In response to the call to the second method, the computer is operative to transmit data identifying the file types that may be stored in the file vault as a response to the call to the second method. The computer may also respond to a call to the third method, by transmitting a schema identifying one or more properties associated with a file type identified in the call to the third method.

According to another embodiment of the invention, a method is provided that exposes a generic interface at an official file server computer for storing files in a file vault. The interface includes a first method for requesting that a file be stored in the file vault. According to the method, a record series is maintained that identifies one or more document types that may be stored in the file vault along with a location for each file type within the file vault where files of the type should be stored. A call may be made to the first method from a collaboration server computer or other type of computer that includes the file to be stored in the file vault. In response to the call, a location for storing the file in the file vault may be identified based on the contents of the record series. Once the location has been identified, the file is stored in the identified location.

According to other aspects of the invention, a determination may be made in response to a call to the first method as to whether the type associated with the file is in the record series and whether one or more necessary property values associated with the type were received with the call. If the file is in the record series and the necessary property values were received with the call to the first method, the file is stored in the file vault in the location specified in the record series for the file type. If the file type is not in the record series or the necessary property values are not received with the call, the file is placed in a holding zone portion of the file vault. A response is also transmitted with a request for the type or the needed properties.

According to other aspects of the method, the generic interface may further expose a second method for retrieving the file types identified in the record series. In response to a call made to the second method, the file types identified in the record series may be returned. Additionally, the generic interface may expose a third method for retrieving one or more properties associated with a one of the file types identified in the record series. In response to a call to the third method identifying one of the file types in the record series, a schema may be returned that identifies the properties associated with the identified file type. The methods may be exposed via a web services protocol or via SMTP.

According to another embodiment of the invention, a method is provided for providing an official file repository. According to the method, a request is received for the identities of one or more file types that may be stored in the file vault. A reply is transmitted to the first request with the available file types. A request may also be received for properties associated with one of the of the file types. A reply may be made with the properties associated with a file type identified by the request. Another request may be received to store a file in the file vault. The request comprises a package including the file, a file type for the file, and one or more property values associated with the file. In response to the request, the file is stored in a location in the file vault, the location of the file vault determined based upon a mapping between the file type for the file and a location in the file vault contained in a record series file.

According to an embodiment of the invention, a determination may be made in response to the request to store a file in the file vault as to whether the file type for the file is identified in the record series. If the file type is not identified in the record series, the file is placed in a holding zone portion of the file vault. If the file type for the file is subsequently received, the file is moved from the holding zone to a location in the file vault determined by the contents of the record series. The file may also be placed in the holding zone if any necessary property values are not received with the request to store the file in the file vault.

The invention may be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
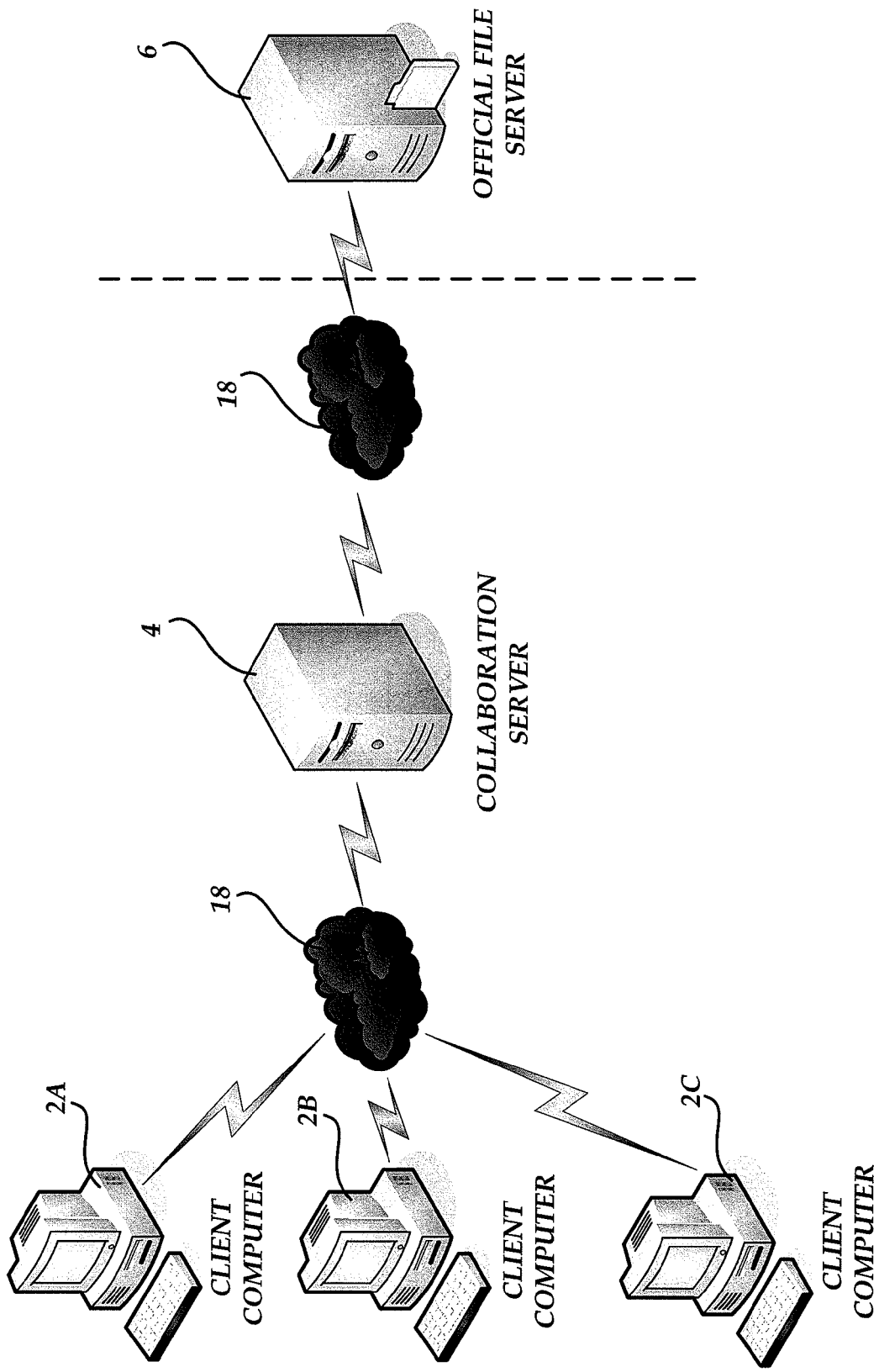
FIG. 1 is a network diagram illustrating aspects of several computer systems provided in one embodiment of the invention.

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that run on an operating system on a server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a network diagram illustrating aspects of several computer systems provided in one embodiment of the invention will be described. In particular, as shown FIG. 1, a number of client computers 2A-2C may be utilized to interact with a collaboration server computer 4. The client computers 2A-2C may comprise standard desktop, laptop, or handheld computers and may be communicatively coupled to the collaboration server 4 via a network 18. The collaboration server 4 comprises a networked server computer operative to provide functionality for groups of users to work collaboratively on the creation of documents, to share information, automate business processes, and to perform other functions. In one embodiment of the invention, the collaboration server 4 is operative to execute the SHAREPOINT PORTAL SERVER collaboration and information sharing portal server application from MICROSOFT CORPORATION of Redmond, Wash. However, it should be appreciated that other collaboration packages from other vendors may be utilized with the various embodiments of the invention.

The collaboration server 4 is, in turn, connected to an official file server 6 via the network 18. The official file server 6 is a server computer operative to provide services for storing files in a file vault for archival. The official file server 6 may also provide document management functions such as retaining documents for an appropriate period of time. As will be described in greater detail below, the official file server 6 is operative to expose a generic interface for placing electronic files into the file vault. In particular, the official file server 6 exposes its functionality in a manner designed to allow files to easily be placed into the file vault without exposing any of the internal organization or operation of the file server 6. In this manner, the official file server 6 effectively provides a barrier to network callers other than the specific interfaces described herein. Additional details regarding the operation of the collaboration server 4 and the official file server 6 are provided below with respect to FIGS. 2-5.

Figure 2:
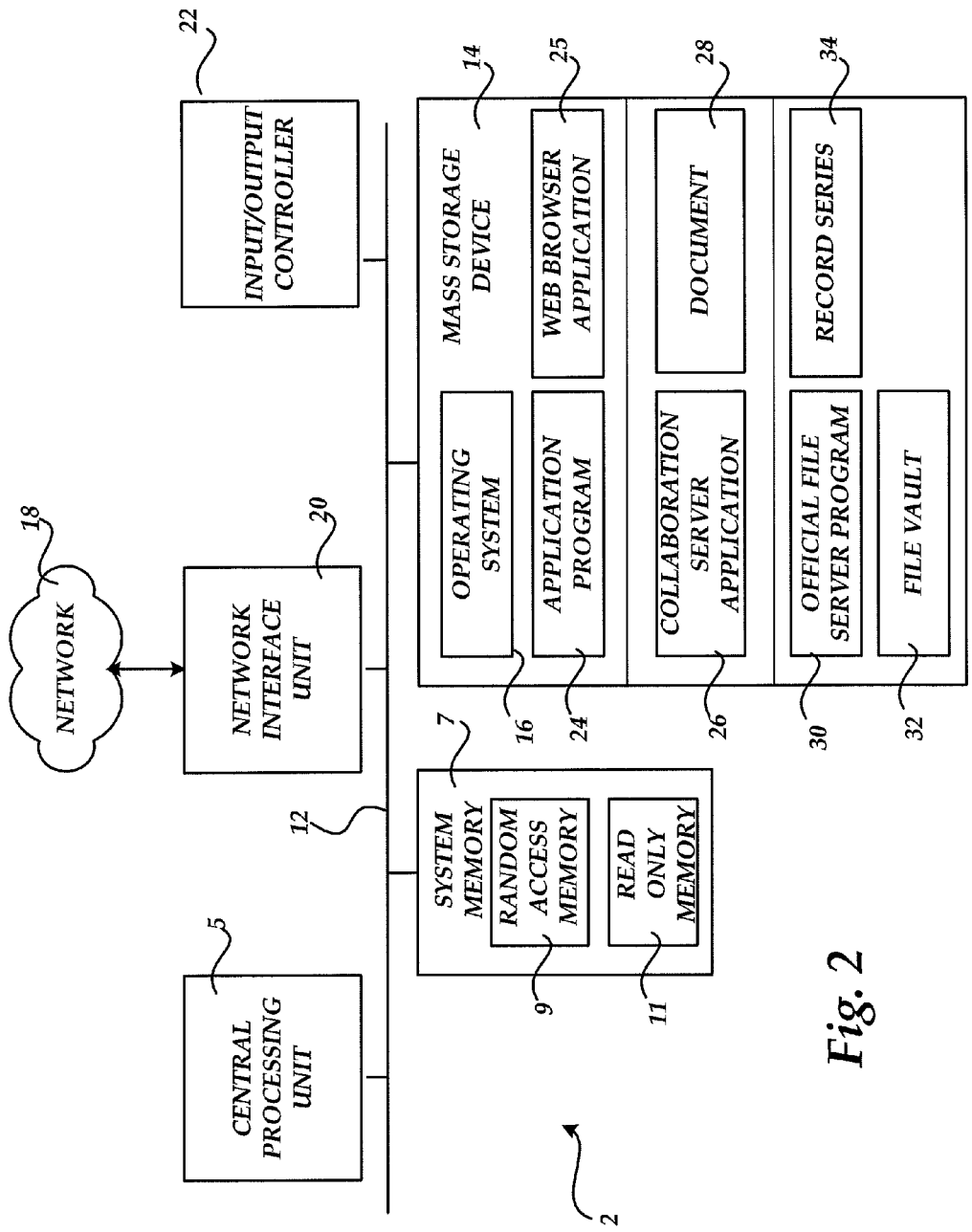
FIG. 2 is a computer system architecture diagram illustrating aspects of several computer systems utilized in and provided by the various embodiments of the invention.

Referring now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a web browser application 25 for interacting with a web-based interface provided by the collaboration server 4.

The web browser application 25 may comprise the INTERNET EXPLORER web browser from MICROSOFT CORPORATION or another web browser. Through the web browser 25, a user of the client computer 2 may interact with the collaboration server 4. In particular, a user may utilize the collaboration services provided by the collaboration server 4. The user may also, at an appropriate time, request that a document stored at the collaboration server 4 be published to the official file server 6. Alternatively, the collaboration server 4 may be operative to periodically publish a document to the official file server 6 at appropriate points during the lifecycle of the document. An application program 24 may also be configured to utilize the services of the official file server 6 directly. For instance, the application program 24 may comprise a word processing application program that is configured to publish word processing documents to the official file server 6. Other types of application programs may be similarly configured and utilized.

It should be appreciated that the collaboration server 4 may utilize some or all of the conventional computing components illustrated in FIG. 2. The collaboration server 4 may also store a number of program modules and data files needed to provide collaboration and information sharing services. In particular, the collaboration server 4 may store and execute an operating system suitable for the operation of a networked server computer, program modules for providing collaboration services, such as the collaboration server application 26, and one or more documents 28. As discussed briefly above, the collaboration server 4 may receive a request from a user to publish a document 28 to the official file server 6. Alternatively, the collaboration server application 26 may be configured to automatically publish a document 28 to the official file server 6 periodically and at appropriate times during the lifecycle of the document 28. Additional details regarding the operation of the collaboration server 4 in this regard are provided below with respect to FIGS. 4-5.

It should also be appreciated that the official file server 6 may utilize some or all of the conventional computing components illustrated in FIG. 2. In particular, the collaboration server 4 may store and execute an operating system suitable for the operation of a networked server computer and an official file server program 30. As will be described in greater detail herein, the official file server program 30 is operative to expose a generic interface for storing electronic files in a file vault 32. The file vault 32 comprises a secure storage area accessible to the server 6. In order to provide these functions, the server 6 also maintains a record series 34. As will be discussed below with reference to FIG. 3, the record series provides the identification of various file types that may be stored in the file vault 32 and the location within the file vault 32 that files of each type should be stored.

Figure 3:
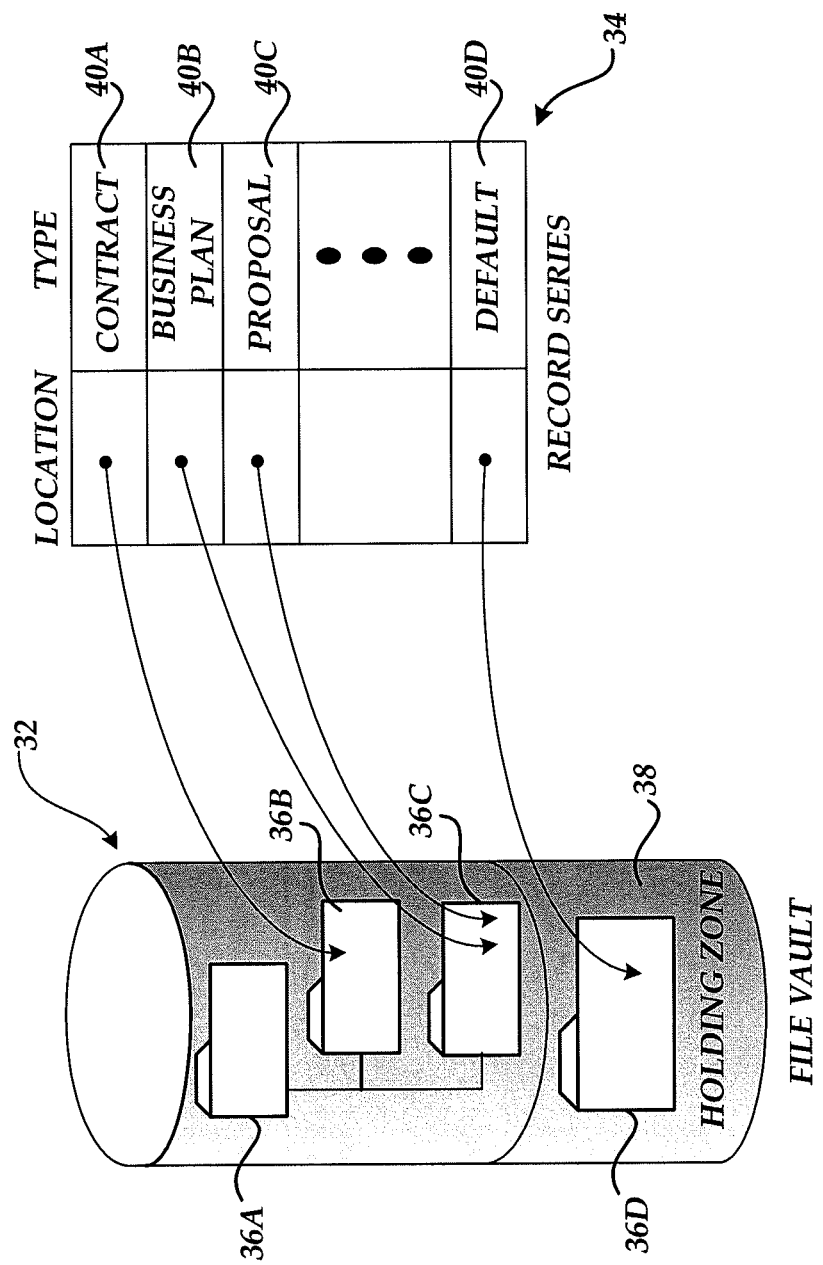
FIG. 3 is a database diagram illustrating aspects of a file vault and a record series data structure utilized in the various embodiments of the invention.

Turning now to FIG. 3, additional details regarding the file vault 32 and the record series 34 utilized by the official file server 6 will be described. As shown in FIG. 3, the file vault 32 comprises a secure storage area accessible to the official file server 6. The file vault 32 may include one or more directories 36A-36D into which received files are placed. As will be described in greater detail below, the particular directory into which a particular file is placed is based upon a mapping contained in the record series 34 between file types and locations in the file vault. It should be appreciated that each directory in the file vault 36D may have different policies applied to it. For instance, files contained in each of the directories may be subject to a different retention schedule or other type of document management policy. It is up to the document administrator to define the contents of the record series 34 in a manner designed to place particular file types in directories having appropriate policies for the file type.

According to one embodiment of the invention, the file vault 32 includes a holding zone 38. The holding zone 38 includes a directory 36D into which files are placed if the file does not match any of the file types specified in the record series 34. A file may also be placed into the holding zone 38 if needed properties for the file are not specified. The official file server 6 may provide an interface for accessing files held in the holding zone 38 and providing the needed type or property information for the file. Once this information has been provided, the official file server 6 may move the file from the holding zone 38 to the appropriate directory 36A-36C in the file vault 38.

As shown in FIG. 3, the record series 34 comprises a data structure that maps file types 40A-40D to locations within the file vault 32. For instance, in the example record series 34 shown in FIG. 3, documents of type "contract" are mapped to the directory 36B. Accordingly, when the official file server 6 receives a document that is a contract, the file server 6 places the document in the directory 36B. A default file type 40D may also be specified for files that do not include a description of their file type. In the example record series 34 shown in FIG. 3, the default file type 40D is linked to the directory 36D in the holding zone 38. However, the default file type 40D may be linked to any location in the file vault 32.

As will also be described in greater detail below, the official file server 6 exposes several functions for placing documents in the file vault 32. The official file server 6 also exposes a function through which a program may learn the identities of the types of documents that may be stored in the file vault 32. The location specified within the file vault 32 for the files is not available through the interface. An additional interface may be provided through which a caller may identify one or more properties for a particular file type. By utilizing these methods, a calling application may specify the appropriate file type and property values for a file prior to sending the file to the official file server 6 for storage in the file vault 32. Additional details regarding this process are described below with reference to FIGS. 4-5.

Figure 4:
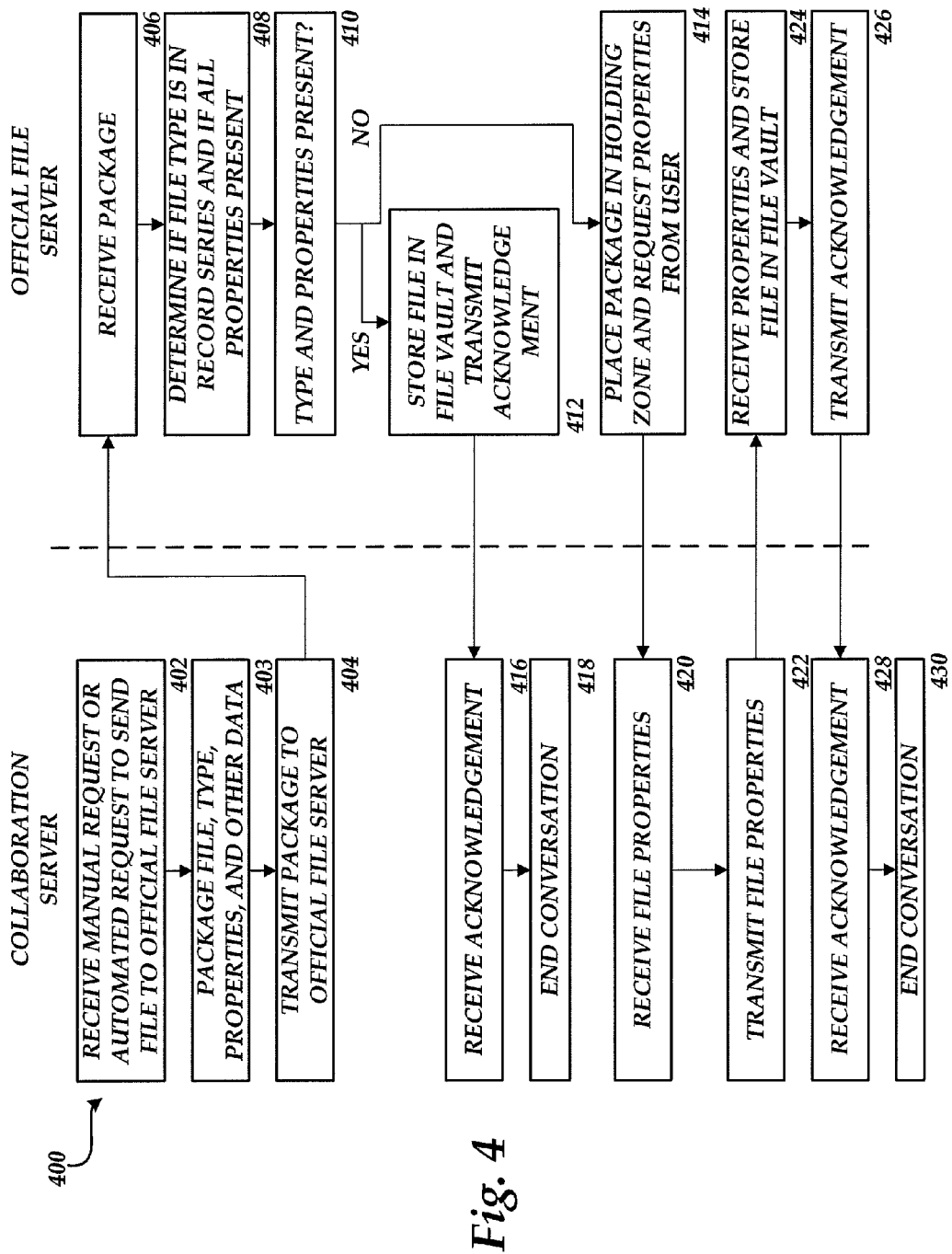
FIGS. 4-5 are flow diagrams illustrating aspects of various routines provided in embodiments of the invention for providing an official file repository.

Referring now to FIG. 4, an illustrative routine 400 will be described illustrating a process for providing an official file repository according to one embodiment of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

When viewing the routine 400, it should be appreciated that, although described together, the operations 402, 403, 404, 416, 418, 420, 422, 428, and 430 are performed at the collaboration server 4 and that the operations 406, 408, 410, 412, 414, 424, and 426 are performed at the official file server 6. It should also be appreciated that although described and illustrated as being performed linearly, these operations may be performed in an asynchronous manner.

The routine 400 begins at operation 402, where a request is received to send a file to the official file server 6. The request may be made manually, such as for instance by a user of one of the client computers 2A-2C, or automatically by the collaboration server 4 as a part of a document workflow. In response to the request, the routine 400 continues to operation 402, where the file, the file type associated with the file, any property values for the file, and potentially other data about the file, are package for transmission to the official file server 6. In this embodiment of the invention, the collaboration server 4 does not query the official file server 6 for appropriate types and their property values prior to sending the file. Accordingly, the type information and property values are specified without knowledge of whether they are appropriate for the configuration of the official file server 6. The package containing the file and other data is transmitted to the official file server 6 at operation 404.

At operation 406, the official file server 6 receives the package containing the file from the collaboration server 4 and extracts its contents. The routine 400 then continues to operation 408, where the official file server 6 determines whether the file type specified with the file is identified in the record series 34. The official file server 6 also determines whether necessary property values were received in the package. If the type is identified in the record series 34 and the appropriate property values were specified, the routine 400 branches from operation 410 to operation 412. If the type was not identified or the property values were not provided, the routine 400 continues from operation 410 to operation 414.

At operation 412, the received file is stored in the directory of the file value 32 specified by the appropriate entry in the record series 34. An acknowledgement is also transmitted to the collaboration server 4 indicating that the file was received.

At operation 416 the acknowledgement is received at the collaboration server 4. The conversation between the collaboration server 4 and the official file server 6 ends at operation 418.

At operation 414, the received package is placed into the holding zone 38. A request is also transmitted from the official file server 6 to the collaboration server 4 requesting that the needed type or properties be provided. At operation 420, the collaboration server 4 receives the file type or properties from a user. At operation 3422, the file type or properties are transmitted from the collaboration server 4 to the official file server 6.

At operation 424, the official file server 6 receives the needed file type or properties. The official file server 6 also moves the file from the holding zone 38 to the appropriate directory in the file vault 32 as specified by the record series 34. At operation 426, an acknowledgement is transmitted to the collaboration server 4 indicating that the type and properties were received and that the file was successfully added to the file vault. At operation 428, the acknowledgement is received at the collaboration server 4. The conversation between the collaboration server 4 and the official file server 6 ends at operation 430.

Figure 5:
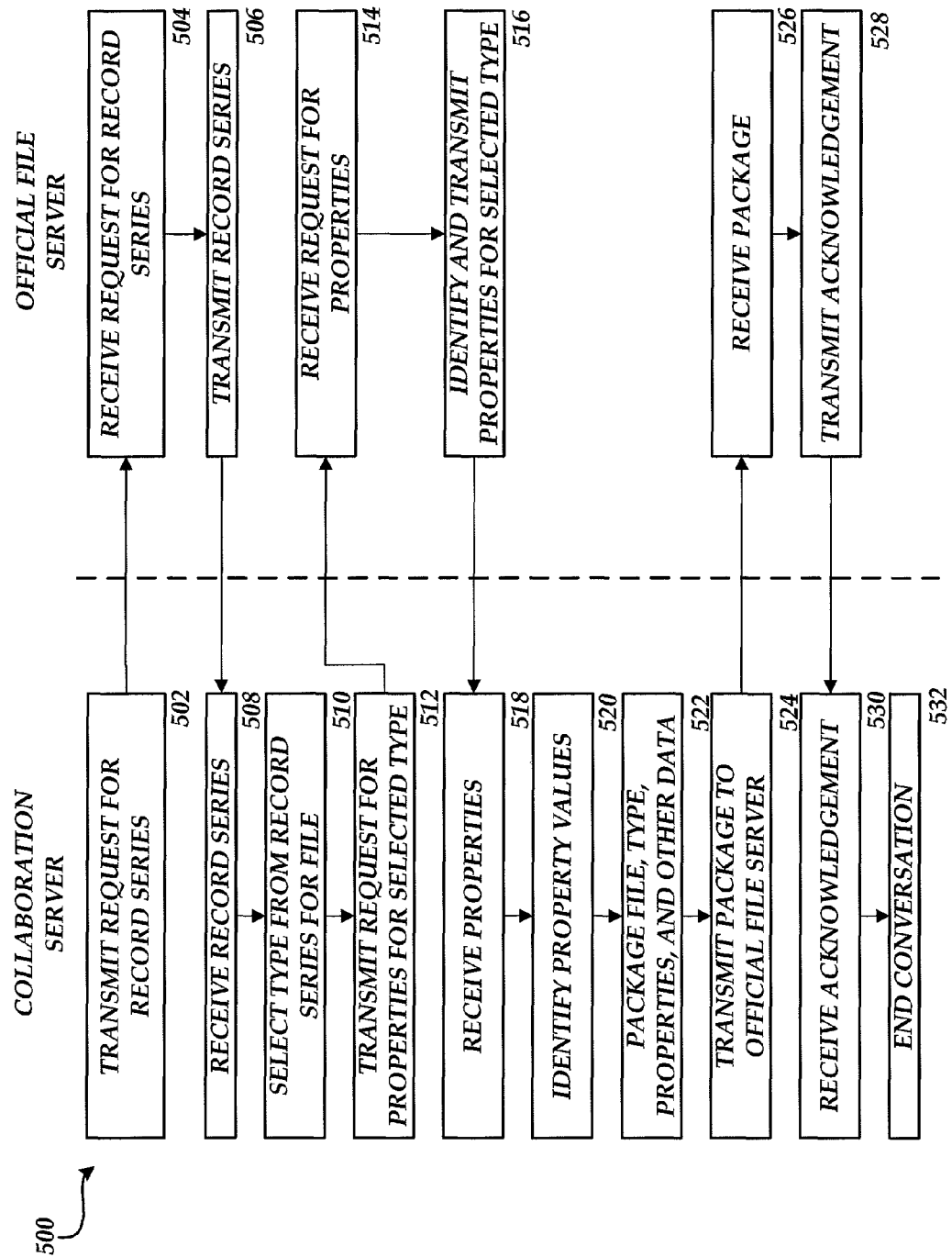

Referring now to FIG. 5, an illustrative routine 500 will be described for providing an official file repository according to another embodiment of the invention. According to this method, the official file server 6 exposes a method through which a caller may receive a list of the file types identified in the record series, a method through which a caller may receive a list of the properties associated with a particular type identified in the record series, and a method for transmitting a file to the official file server 6 along with the type and any property values. Another method may also be exposed for accessing information about the official file server 6, such as the version number of the official file server program 30. It should be appreciated that, according to embodiments of the invention, these methods may be exposed utilizing web services protocols, such as the simple object access protocol ("SOAP"), or may be called utilizing e-mail messages transmitted utilizing the simple mail transfer protocol ("SMTP").

The routine 500 begins at operation 502, where the collaboration server 4 transmits a request to the official file server 6 for a list of the types identified in the record series 34. The request is received by the official file server 6 at operation 504. In response to the request, the official file server 6 transmits a list of the file types identified in the record series 34 to the collaboration server 4 at operation 506. The record series is received at the collaboration server 4 at operation 508. At operation 510, a selection of the appropriate type is made from the list of available types. The selection may be made by a user or programmatically by the collaboration server 4.

From operation 510, the routine 500 continues to operation 512, where the collaboration server 4 transmits a request to the official file server 6 for the properties associated with the selected file type. The request is received by the official file server 6 at operation 512. In response to the request, the official file server 6 identifies any properties associated with the selected file type at operation 516 and transmits a schema identifying the properties to the collaboration server 4. The properties are received by the collaboration server 4 at operation 518. The routine 500 then continues to operation 520, where the appropriate property values are identified and utilized to populate the properties. The file, file type, and property values are then packaged for transmission to the official file server 6. Additional data related to the file may also be included, such as meta-data identifying a revision history or audit log for the file. At operation 524, the package is transmitted to the official file server 6.

At operation 526, the package is received at the official file server 6 and its contents are extracted. The received file is then stored in the appropriate location in the file vault 32 based on the mapping between the file type and the directories in the file vault. The routine 500 then continues to operation 528, where an acknowledgement is transmitted to the collaboration server 4 indicating that the type and properties were received and that the file was successfully added to the file vault. At operation 530, the acknowledgement is received at the collaboration server 4. The conversation between the collaboration server 4 and the official file server 6 ends at operation 532.

Based on the foregoing, it should be appreciated that the various embodiments of the invention include a method, system, apparatus, and computer-readable medium for providing an official file repository. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for storing files in a file vault through an official file server, the method comprising:
    receiving, by the official file server, a first file with a first file type associated with the first file and a second file with the first file type associated with the second file, where the first file is different from the second file;
    determining, at the official file server, that first property information necessary to route the first file to a location in the file vault for the first file type is missing;
    holding the first file in a holding zone at the official file server, wherein the holding zone is different from the location in the file vault;
    requesting, by the official file server, the first property information associated with the first file;
    receiving, at the official file server, the first property information;
    determining a first mapping based on the first property information and the first file type, wherein the first mapping associates the first file type with a specific location in the file vault;
    based on the first mapping, determining the specific location;
    determining, at the official file server, that second property information necessary to route the second file to the location in the file vault for the first file type is not missing;
    determining a second mapping based on the second property information and the first file type, wherein the second mapping associates the first file type with the specific location in the file vault;
    based on the second mapping, determining the specific location;
    storing the first file and the second file in the file vault in the determined specific location.

2. The method as defined in claim 1, wherein the determined specific location is a storage location in the file vault, and wherein the file vault comprises a plurality of storage locations.

3. The method as defined in claim 2, wherein the determined specific location where the first file and the second file may be stored is determined by evaluating a plurality of mappings.

4. The method as defined in claim 1, further comprising identifying a set of predetermined file types that may be stored in the file vault.

5. The method as defined in claim 1, further comprising:
    determining the first file was successfully stored in the file vault; and
    indicating the first file was successfully stored.

6. The method as defined in claim 1, wherein the method is exposed via a web services protocol.

7. A computer readable storage medium not consisting of a propagated data signal and storing computer executable instructions for performing a method comprising:
    maintaining a plurality of locations within a repository, wherein each location is associated with at least one of a plurality of predetermined file types;
    receiving a first file with a first file type associated with the first file and a second file with the first file type associated with the second file, wherein the first file is different from the second file, and wherein the first file and the second file are to be stored in the repository;
    determining that first property information necessary to route the first file to a location in the repository vault for the first file type is missing;
    holding the first file in a holding zone, wherein the holding zone is different from the location in the repository;
    requesting the first property information associated with the first file;
    receiving the first property information;
    determining a first mapping based on the first property information and the first file type, wherein the first mapping associates the first file type with a first location in the repository;
    based on the first mapping, determining the first location;
    determining that second property information necessary to route the second file to the location in the repository for the first file type is not missing;
    determining a second mapping based on the second property information and the first file type, wherein the second mapping associated the first file type with the first location in the repository;
    based on the second mapping, determining the first location; and
    storing the first file with the first property information and the second file with the second property information in the determined first location within the repository.

8. The computer readable storage medium as defined in claim 7, wherein the determining the first location to store the first file and the second file comprises evaluating a plurality of mappings.

9. The computer readable storage medium as defined in claim 7, wherein an official file server requests the first property information.

10. The computer readable storage medium as defined in claim 7, wherein the first property information is received from a client.

11. The computer readable storage medium as defined in claim 7, wherein the method is exposed via a web services protocol.

12. The computer readable storage medium as defined in claim 7, further comprising:
    determining the first file was successfully stored in the repository; and
    indicating the first file was successfully stored.

13. The computer readable storage medium as defined in claim 7, further comprising identifying a set of predetermined file types that may be stored in the repository.

14. A computer system for storing files received from a client, the system comprising:
    an official file server comprising:
        a processor; and
        a memory communicatively coupled to the processor, the memory having computer-executable instructions that when executed by the processor, provide a method for storing files in a file vault, the method comprising:
    receive a first file with a first file type associated with the first file and a second file with a first file type associated with the second file;
    determine that first property information necessary to route the first file to a location in the file vault for the first file type is missing;
    hold the first file in a holding zone, wherein the holding zone is different from the location in the file vault;
    request the first property information associated with the first file;
    receive the first property information;
    determine a first mapping based on the first property information and the first file type, wherein the first mapping associates the first file type with a specific location in the file vault;
    based on the first mapping, determining the specific location;
    determine that second property information necessary to route the second file to a location in the file vault for the first file type is not missing;
    determine a second mapping based on the second property information and the first file type, wherein the second mapping associates the first file type with the specific location in the file vault;
    based on the second mapping, determining the specific location; and
    store the first file and the second file in the file vault in the determined specific location.

15. The system as defined in claim 14, wherein the file vault comprises a plurality of storage locations.

16. The system as defined in claim 14, wherein the official file server is configured to retrieve data about the file vault.

* * * * *